United States Patent

Eichenauer et al.

Patent Number: 5,210,135
Date of Patent: May 11, 1993

[54] ABS MOULDING COMPOUNDS WITH IMPROVED YIELD STRESS

[75] Inventors: Herbert Eichenauer, Dormagen; Alfred Pischtschan, Kuerten; Karl-Heinz Ott, Leverkusen, all of Fed. Rep. of Germany

[73] Assignee: Bayer Aktiengesellschaft, Leverkusen-Bayerwerk, Fed. Rep. of Germany

[21] Appl. No.: 936,069

[22] Filed: Aug. 26, 1992

Related U.S. Application Data

[63] Continuation of Ser. No. 559,847, Jul. 30, 1990, abandoned.

[30] Foreign Application Priority Data

Aug. 9, 1989 [DE] Fed. Rep. of Germany ....... 3926273

[51] Int. Cl.$^5$ .............................................. C08L 51/04
[52] U.S. Cl. ........................................ 525/71; 525/73; 525/74; 525/75; 525/77; 525/80; 525/84; 525/85; 525/86
[58] Field of Search ............ 525/71, 73, 74, 75, 525/77, 80, 84, 85, 86

[56] References Cited

U.S. PATENT DOCUMENTS

| | | | |
|---|---|---|---|
| 4,009,226 | 2/1977 | Orr et al. | 525/71 |
| 4,849,473 | 7/1989 | Cigna et al. | 525/71 |
| 4,916,186 | 4/1990 | Burk et al. | 525/71 |

FOREIGN PATENT DOCUMENTS 264721 4/1988 European Pat. Off. .
2141432 12/1984 United Kingdom .

*Primary Examiner*—John C. Bleutge
*Assistant Examiner*—D. Aylward
*Attorney, Agent, or Firm*—Connolly & Hutz

[57] ABSTRACT

Thermoplastic molding compounds, containing

A) 5-95 weight % of a thermoplastic homo-, co- or terpolymer of styrene, alpha-methylstyrene, ring-substituted styrene, methyl methacrylate, acrylonitrile, methacrylonitrile, maleic anhydride, N-substituted maleimide, vinyl acetate or mixtures thereof, B) 5-95 weight % of a graft polymer of
  B.1) 5-90 parts by weight of styrene, alpha-methylstyrene, ring-substituted styrene, methyl methacrylate, acrylonitrile, methacrylonitrile, maleic anhydride, N-substituted maleimide, vinyl acetate or mixtures thereof on
  B.2) 95-10 parts by weight of a rubber with a glass transition temperature $\leq 10°$ C. and C) 0.1-5 parts by weight per 100 parts by weight A+B of a grafted product of resin-forming monomers on an ethylene-propylene-diene terpolymer rubber with a rubber content of 20-60 weight %.

11 Claims, No Drawings

ABS MOULDING COMPOUNDS WITH IMPROVED YIELD STRESS

This is a continuation of Ser. No. 07/559,847, now abandoned.

ABS polymers are chemical materials which are outstanding for their well-balanced tenacity, deflection temperature under load, processability and surface quality. If one property, e.g. the tenacity or the deflection temperature under load, is improved, the result is very commonly losses for other properties.

The production of ABS materials with good tenacity, high yield stress and good processability represents a special problem: the measures suitable for raising the tenacity, such as increasing the graft rubber content or the molecular weight of the styrene/acrylonitrile copolymer resin matrix, lead simultaneously to a large reduction of the stiffness or to a definitely worsened thermoplastic processability as a result of a large increase of the melt viscosity.

The addition of small amounts of silicone oil as proposed in EP-A-6521 for improving the tenacity leads in the tensile test to a definite deterioration of the yield stress, through which on demolding the corresponding moldings made by injection molding, white discolorations can appear.

It has been found that ABS materials with good tenacity, easy processability and high yield stress are obtained while preserving the other characteristic properties of ABS polymers by the addition of special polymers.

Thermoplastic molding compounds are the subject matter of the present invention, containing A) 5-95 weight %, preferably 10-90 weight % and especially 20-75 weight % of one or more thermoplastic homo-, co- or terpolymers of styrene, alpha-methylstyrene, ring-substituted styrene, methyl methacrylate, acrylonitrile, methacrylonitrile, maleic anhydride, N-substituted maleimide, vinyl acetate or mixtures thereof, B) 5-95 weight %, preferably 10-90 weight % and especially 25-80 weight % of a graft polymer of
  B.1) 5-90 parts by weight, preferably 30-80 parts by weight of styrene, alpha-methylstyrene, ring-substituted styrene, methyl methacrylate, (meth)acrylonitrile, maleic anhydride, N-substituted maleimide, vinyl acetate or mixtures thereof on
  B.2) 95-10 parts by weight, preferably 70-20 parts by weight, of a rubber with a glass transition temperature <10° C. and C) 0.1-5 parts by weight, preferably 0.5-4 parts by weight per 100 parts weight A+B of a grafted product of resin-forming monomers on an ethylene-propylene-diene terpolymer rubber with a rubber content of 20-60 weight %, preferably of 25-50 weight %.

To the blends according to the invention can be added the usual additives such as flame retardants, stabilizers, mold release agents, pigments, lubricants, antistatic agents and fillers in the usual amounts.

Through the addition of C), molding compounds of the ABS type are obtained which show, in addition to good tenacity and easy processability, a high yield stress.

This means that by thermoplastic processing of the molding compounds according to the invention, tough injection moldings can easily be produced which show no white discoloration on demolding.

Thermoplastic polymers A) which are suitable according to the invention are those from styrene, alpha-methylstyrene, p-methylstyrene, vinyltoluene, halogenostyrene, methyl acrylate, methyl methacrylate, acrylonitrile, maleic anhydride, N-substituted maleimide or mixtures thereof.

The polymers A) are resinous, thermoplastic and rubber-free. Especially preferred polymers A) are those from styrene, methyl methacrylate, styrene/acrylonitrile mixtures, styrene/acrylonitrile/methyl methacrylate mixtures, styrene/methyl methacrylate mixtures, acrylonitrile/methyl methacrylate mixtures, alpha-methylstyrene/acrylonitrile mixtures, styrene/alpha-methylstyrene/acrylonitrile mixtures, alphamethylstyrene/methyl methacrylate/acrylonitrile mixtures, styrene/alpha-methylstyrene/methyl methacrylate mixtures, styrene/alpha-methylstyrene/methyl methacrylate/acrylonitrile mixtures, styrene/maleic anhydride mixtures, methyl methacrylate/maleic anhydride mixtures, and styrene/methyl methacrylate/maleic anhydride mixtures.

The polymers A) are known and can be produced by radical polymerization, especially by emulsion, suspension, solution or bulk polymerization. They preferably have molecular weights $\overline{M}_W$ of 20,000 to 200,000 or intrinsic viscosities $[\eta]$ of 20 to 110 ml/g (measured in dimethylformamide at 25° C.).

Suitable rubbers for the production of graft polymers B) are especially polybutadiene, butadiene/styrene copolymers, butadiene/acrylonitrile copolymers, polyisoprene or alkyl acrylate rubbers based on $C_1$–$C_8$ alkyl acrylates, especially ethyl, butyl and ethylhexyl acrylates.

The acrylate rubbers can possibly contain up to 30 weight % (relative to the rubber weight) of copolymerized monomers such as vinyl acetate, acrylonitrile, styrene, methyl methacrylate and/or vinyl ethers. The acrylate rubbers can also contain small amounts, preferably up to 5 weight % (relative to the rubber weight) of polymerized-in ethylenically unsaturated monomers with crosslinking action. Crosslinkers are e.g. alkylene diol diacrylates and methacrylates, polyester diacrylates and methacrylates, divinylbenzene, trivinylbenzene, triallyl cyanurate, allyl acrylate and methacrylate, butadiene and isoprene. The grafting bases can also be acrylate rubbers with the core/shell structure with a core of crosslinked diene rubber from one or more conjugated dienes, such as polybutadiene, or a copolymer of a conjugated diene with an ethylenically unsaturated monomer, such as styrene and/or acrylonitrile.

Preferred rubbers for the production of the graft polymers B) are diene and alkyl acrylate rubbers.

The rubbers are present in the graft polymer B) in the form of at least partially crosslinked particles of a mean particle diameter ($d_{50}$) of 0.05 to 20.0 microns, preferably of 0.1 to 2.0 microns and especially of 0.1 to 0.8 microns. The mean particle diameter $d_{50}$ is determined by ultracentrifuge measurements following W. Scholtan et al., Kolloid-Z. u.Z. Polymere 250 (1972), 782-796.

The graft polymers B) can be produced by radical graft polymerization of the monomers B.1) in presence of the rubbers B.2) to be grafted onto.

Preferred production processes for the graft polymers B) are emulsion, solution, bulk or suspension polymerization as well as combinations of these processes known in themselves. Especially preferred graft polymers B) are the ABS polymers.

Suitable as C) are grafted products which are obtained by polymerization of resin-forming monomers such as mixtures of styrene and acrylonitrile in the weight ratio 10:1 to 1:1, preferably 5:1 to 2:1, in presence of a rubber (so-called EPDM rubber) built up from ethylene, propylene and a non-conjugated diene (e.g. dicyclopentadiene, ethylidenenorbornene). The production of these materials, which are also known as AES graft polymers, is known, and is described for example in EP-A-96 527, EP-A-264 721 and EP-A-286 071. AES polymers which are suitable according to the invention are those with a rubber content of 20 to 60 weight %, preferably of 25 to 50 weight %.

Especially preferred mixtures consist of 10-80 weight % of a graft polymer of 30-80 parts by weight of styrene, alpha-methylstyrene, p-methylstyrene, methyl methacrylate, acrylonitrile or mixtures thereof on 70-20 parts by weight of polybutadiene, 90-20 weight % of a thermoplastic copolymer from 5-40 parts by weight acrylonitrile and 95-60 parts by weight styrene, alpha-methylstyrene, p-methylstyrene, methyl methacrylate or mixtures thereof and 0.5-4 parts by weight per 100 parts by weight A+B of a grafted product of resin-forming monomers on an ethylene-propylene-diene terpolymer rubber.

The blends according to the invention, containing A), B) and C) and possibly usual additives such as lubricants, stabilizers, pigments, mold release agents, antistatic agents and fillers are produced by mixing the constituents in known manner simultaneously or successively at room temperature or higher temperature and then melt-compounding or melt-extruding at 150° C. to 300° C. in commonly used units such as internal kneaders, extruders or double-shaft screws.

The molding compounds of the invention can be used for the production of moldings of any kind, for which usual production methods can be used; moldings can be produced in particular by injection molding.

Another form of processing of the molding compounds according to the invention is the production of moldings by drawing from sheets or films produced previously by known processes.

EXAMPLES

Thermoplastic Resin A

Statistical styrene/acrylonitrile=78:28—copolymer with a $\overline{M}_W$ of ca. 115,000 and a non-uniformity $\overline{M}_W/\overline{M}_n - 1 \leq 2.0$.

Graft Polymer—B$_1$

Grafted product obtained by emulsion polymerization of 50 weight % of a styrene/acrylonitrile mixture (weight ratio 72:28) on 50 weight % particulate polybutadiene with a mean particle diameter ($d_{50}$) of 0.4 microns. Working up by coagulation of the latex with an acetic acid/magnesium sulphate mixture followed by drying in vacuo.

Graft Polymer—B$_2$

Grafted product obtained by emulsion polymerization of 50 weight % of a styrene/acrylonitrile mixture (weight ratio 72:28) on 50 weight % particulate polybutadiene with a mean particle diameter ($d_{50}$) of 0.1 microns. Working up as described under B1.

AES Grafted Product C

Grafted product based on an EPDM rubber (mean particle diameter ($d_{50}$) ca. 300 nm). (Co-blend W4 of Montedipe). Rubber content ca. 33%.

A), B) and C) were compounded with 2 parts by weight ethylenediamine bisstearylamide (Examples 1 to 10) or 2 parts by weight pentaerythritol tetrastearate (Examples 11 to 13) as lubricant in a 1.3 liter internal kneader at temperatures of 160° C. to 200° C. The moldings were produced on an injection molding machine at 240° C.

The notch impact strength ($a_k$) was determined at room temperature according to DIN 53 456 (unit kJ/m²); and the yield stress ($\sigma_s$) by tensile test according to DIN 53 455. The thermoplastic processability was characterized by measurement of the required filling pressure at 240° C. (see F. Johannaber, Kunststoffe 74 (1984), 1, pages 2-5).

The compositions of the molding compounds examined together with the measurements obtained are assembled in Table 1. Compared with the comparative tests the mixtures according to the invention show good tenacity and high yield stress with very good thermoplastic processability. Addition of a silicone oil according to EP-A-6521 indeed gives good tenacity, but yield stress and processability clearly decline.

TABLE 1

| | Compositions and Test Results of the Moulding Compounds | | | | | | | |
|---|---|---|---|---|---|---|---|---|
| Example No. | A Parts by wt. | B1 Parts by wt. | B2 Parts by wt. | C Parts by wt. | Silicone oil Pts. wt. | $a_k$ [kJ/m²] | ($\sigma_s$) [N/mm²] | Filling pressure [bar] |
| 1 | 80 | 10 | 10 | 3.3 | | 4.5 | 56.8 | 274 |
| 2 (comparison) | 80 | 10 | 10 | | | 4 | 56.1 | 283 |
| 3 (comparison) | 80 | 10 | 10 | | 0.1 | 5 | 53.2 | 286 |
| 4 | 70 | 15 | 15 | 1.65 | | 10 | 52.0 | 304 |
| 5 | 70 | 15 | 15 | 3.3 | | 11 | 52.3 | 299 |
| 6 (comparison) | 70 | 15 | 15 | | | 9 | 52.8 | 306 |
| 7 (comparison) | 70 | 15 | 15 | | 0.1 | 11 | 47.3 | 312 |
| 8 | 60 | 20 | 20 | 3.3 | | 14 | 46.4 | 320 |
| 9 (comparison) | 60 | 20 | 20 | | | 11 | 48.8 | 328 |
| 10 (comparison) | 60 | 20 | 20 | | 0.1 | 14.5 | 42.8 | 332 |
| 11 | 50 | 50 | | 3.75 | | 15.5 | 43.2 | 400 |
| 12 (comparison) | 50 | 50 | | | | 11.5 | 43.0 | 411 |
| 13 (comparison) | 50 | 50 | | | 0.1 | 16.5 | 35.5 | 415 |

What is claimed is:

1. Thermoplastic molding compounds, containing
A) 5-95 weight % of a thermoplastic homo-, co- or terpolymer of styrene, alpha-methylstyrene, ring-substituted styrene, methyl methacrylate, acrylonitrile, methacrylonitrile, maleic anhydride, N-substituted maleimide, vinyl acetate or mixtures thereof, B) 5–95 weight % of a graft polymer of
  B.1) 5–90 parts by weight of styrene, alpha-methylstyrene, ring-substituted styrene, methyl methacrylate, acrylonitrile, methacrylonitrile, maleic anhydride, N-substituted maleimide, vinyl acetate or mixtures thereof graft polymerized onto
  B.2) 95–10 parts by weight of a polybutadiene, butadiene styrene copolymers, butadiene acrylonitrile copolymers, polyisoprene or alkyl acrylate rubber C) 0.5–4 parts by weight per 100 parts by weight of A+B of a grafted product of a mixture of styrene and acrylonitrile graft polymerized onto an ethylenepropylene-diene terpolymer rubber with a rubber content of 20–60 weight %.

2. Thermoplastic molding compounds containing
A) 90–20 weight % of a thermoplastic resin from 5–40 parts by weight of acrylonitrile and 95–60 parts by weight of styrene, alpha-methylstyrene, p-methylstyrene, methyl methacrylate, n-substituted maleic imide or mixtures thereof, B) 10–80 weight % of a graft polymer of 30–80 parts by weight of styrene, alpha methylstyrene, p-methylstyrene, methyl methacrylate, acrylonitrile, acrylate rubber or mixtures thereof graft polymerized on 70–20 parts by weight of polybutadiene and C) 0.5–4 parts by weight per 100 parts by weight of A+B of a grafted product styrene and acrylonitrile on an ethylene-propylene diene terpolymer rubber.

3. The thermoplastic compound as claimed in claim 1, wherein component A) is from 10 to 90 weight %.

4. The thermoplastic compound as claimed in claim 1, wherein component A) is from 20 to 75 weight %.

5. The thermoplastic compound as claimed in claim 1, wherein component B) is from 10 to 90 weight %.

6. The thermoplastic compound as claimed in claim 1, wherein component B) is from 20 to 80 weight %.

7. The thermoplastic compound as claimed in claim 1, wherein rubber of component C) is from 25 to 50 weight %.

8. The thermoplastic compound as claimed in claim 1, wherein the compound further contains an additive.

9. The thermoplastic compound as claimed in claim 2, wherein the compound further contains an additive.

10. The thermoplastic compound as claimed in claim 8, wherein the additive is selected from the group consisting of lubricants, stabilizers, pigments, mold release agents, antistatic agents and fillers.

11. The thermoplastic compound as claimed in claim 9, wherein the additive is selected from the group consisting of lubricants, stabilizers, pigments, mold release agents, antistatic agents and fillers.

* * * * *